US009422989B2

(12) United States Patent
Umemura et al.

(10) Patent No.: US 9,422,989 B2
(45) Date of Patent: Aug. 23, 2016

(54) ELECTROMAGNETIC CLUTCH DEVICE, ACTUATOR DEVICE AND CONTROLLER FOR CONTROLLING OPENING AND CLOSING BODY FOR VEHICLE

(71) Applicants: AISIN SEIKI KABUSHIKI KAISHA, Kariya-shi (JP); OGURA CLUTCH CO., LTD., Kiryu-shi (JP)

(72) Inventors: Eisuke Umemura, Kasugai (JP); Tomohiro Negishi, Kariya (JP); Seiichi Sumiya, Takahama (JP); Keisuke Matsumoto, Anjo (JP); Fumiaki Togitani, Nagoya (JP); Takashi Yamaguchi, Kiryu (JP)

(73) Assignees: AISIN SEIKI KABUSHIKI KAISHA, Kariya-Shi, Aichi-Ken (JP); OGURA CLUTCH CO., LTD., Kiryu-Shi, Gunma (JP)

( * ) Notice: Subject to any disclaimer, the term of this patent is extended or adjusted under 35 U.S.C. 154(b) by 141 days.

(21) Appl. No.: 14/322,173

(22) Filed: Jul. 2, 2014

(65) Prior Publication Data
US 2015/0014118 A1 Jan. 15, 2015

(30) Foreign Application Priority Data
Jul. 10, 2013 (JP) ................................. 2013-144883

(51) Int. Cl.
*F16D 27/112* (2006.01)
(52) U.S. Cl.
CPC .................................... *F16D 27/112* (2013.01)
(58) Field of Classification Search
CPC ..... F16D 27/10; F16D 27/108; F16D 27/112; F16D 27/14
See application file for complete search history.

(56) References Cited

U.S. PATENT DOCUMENTS 3,326,343 A * 6/1967 Stuckens ............... F16D 27/112
192/105 B
3,650,361 A * 3/1972 Fossum ................. F16D 27/112
188/267

(Continued)

FOREIGN PATENT DOCUMENTS

JP 2000-179233 * 6/2000
JP 2008-095704 A 4/2008

OTHER PUBLICATIONS

U.S. Appl. No. 14/896,579, filed Dec. 7, 2015, Aisin Seiki Kabushiki Kaisha.

*Primary Examiner* — Jacob S Scott
(74) *Attorney, Agent, or Firm* — Buchanan Ingersoll & Rooney PC

(57) ABSTRACT

An electromagnetic clutch device includes an armature, a rotor, an electromagnet, and a silencing member. The armature is supported by a driving member so that the armature is movable in the axial direction and rotate integrally with the driving member. The rotor is arranged coaxially with the armature, rotate with respect to the armature and rotate integrally with an output member. The electromagnet presses the armature and the rotor against each other based on an electromagnetic attraction force generated when current is supplied through the electromagnet to be coupled with each other in the torque transmittable manner. The silencing member is provided on an outer circumferential portion of the armature to attenuate noise generated by the vibration of the armature in a state where the silencing member is out of contact with any member other than the armature.

5 Claims, 5 Drawing Sheets

(56) References Cited

U.S. PATENT DOCUMENTS

| | | | | |
|---|---|---|---|---|
| 4,567,975 A | * | 2/1986 | Roll | B23Q 9/0021 192/30 V |
| 5,601,176 A | * | 2/1997 | Ishimaru | F16D 27/112 192/200 |
| 6,209,699 B1 | * | 4/2001 | Hayashi | F16D 27/112 192/200 |
| 2005/0269183 A1 | * | 12/2005 | Ohtsuka | F16D 27/112 192/84.961 |
| 2010/0155191 A1 | * | 6/2010 | Fukumoto | F16D 27/004 192/84.8 |

* cited by examiner

ELECTROMAGNETIC CLUTCH DEVICE, ACTUATOR DEVICE AND CONTROLLER FOR CONTROLLING OPENING AND CLOSING BODY FOR VEHICLE

BACKGROUND OF THE INVENTION

The present invention relates to an electromagnetic clutch device, an actuator device, and a controller for controlling an opening and closing body for a vehicle.

Generally, an electromagnetic clutch device includes an armature and a rotor. The armature is supported by a driving member so that the armature is movable in the axial direction and rotates integrally with the driving member. The rotor is arranged coaxially with the armature, rotates with respect to the armature, and rotates integrally with an output member. In the electromagnetic clutch device, the armature and the rotor are pressed against each other based on the electromagnetic attraction force generated by an electromagnet. This couples two rotators (i.e., the armature and the rotor) in a torque transmittable manner.

In such an electromagnetic clutch device, generally, the gap between the armature and the rotor, which face each other, is set to a value as small as possible. This is because the broader the gap between the armature and the rotor is, the greater the contact sound generated by contact between the armature and the rotor becomes. Accordingly, for example, in the electromagnetic clutch device disclosed in Japanese Laid-Open Patent Publication No. 2008-95704, a damping member formed of a viscoelastic material is located between the driving member and the armature. The armature is urged based on the elastic force of the damping member in the axial direction so that the armature contacts the rotor. This limits the generation of the contact sound.

However, if the gap between the armature and the rotor is reduced as described above, relative rotation may be caused in a decoupled state between the armature and the rotor while sliding on each other due to reverse input from the output member. At this time, there is a problem that an abnormal noise occurs according to the stick-slip phenomenon, in which the friction surfaces of the armature and the rotor are microscopically fixed to and slide on each other.

In consideration of such a problem, in the the electromagnetic clutch device disclosed in the above publication, the damping member is fixed to the armature. This maintains the contact state between the damping member and the armature and efficiently reduces the vibration of the armature, which improves the muting effect (silencing effect).

As for further improvement of the silence, the fact is that even the silencing effect in the above described prior art cannot be recognized as sufficient. Accordingly, a more effective silencing structure is desired. In this respect, the electromagnetic clutch device of the publication has room for improvement.

SUMMARY OF THE INVENTION

An objective of the present invention is to provide an electromagnetic clutch device and an actuator device with a more effective silencing performance.

According to an aspect of the present invention, an electromagnetic clutch device including: an armature, a rotor, an electromagnet, and a silencing member is provided. The armature is adapted to be supported by a driving member so that the armature is movable in an axial direction and rotates integrally with the driving member. The rotor is adapted to be arranged coaxially with the armature. The rotor rotates with respect to the armature and rotates integrally with an output member. The electromagnet presses the armature and the rotor against each other based on an electromagnetic attraction force generated when current is supplied through the electromagnet, thereby coupling the armature and the rotor to each other in a torque transmittable manner. The silencing member is provided on an outer circumferential portion of the armature. The silencing member is formed of a soft material that attenuates noise generated by vibration of the armature in a state where the silencing member is out of contact with any member other than the armature.

It is preferable that the silencing member be annular and fit the outer circumferential portion of the armature.

It is preferable that the silencing member include flanges that sandwich the armature in the axial direction.

It is preferable that the outer circumferential portion include a thin portion with a small thickness in the axial direction.

It is preferable that the armature have a facing surface, which faces the rotor in the axial direction, and the thin portion include a tapered surface on a surface of the armature opposite to the facing surface.

It is preferable that an urging member be located between the driving member and the armature. The urging member urges the armature in the axial direction at a radially inner position with respect to the silencing member to bring the armature into contact with the rotor.

According to another aspect of the present invention, an actuator device including the above electromagnetic clutch device is provided.

According to yet another aspect of the present invention, an opening and closing body controller for a vehicle including the above actuator device is provided.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, an actuator device and an electromagnetic clutch device applied to a power slide door device according to one embodiment will be described with reference to the drawings.

Figure 1:
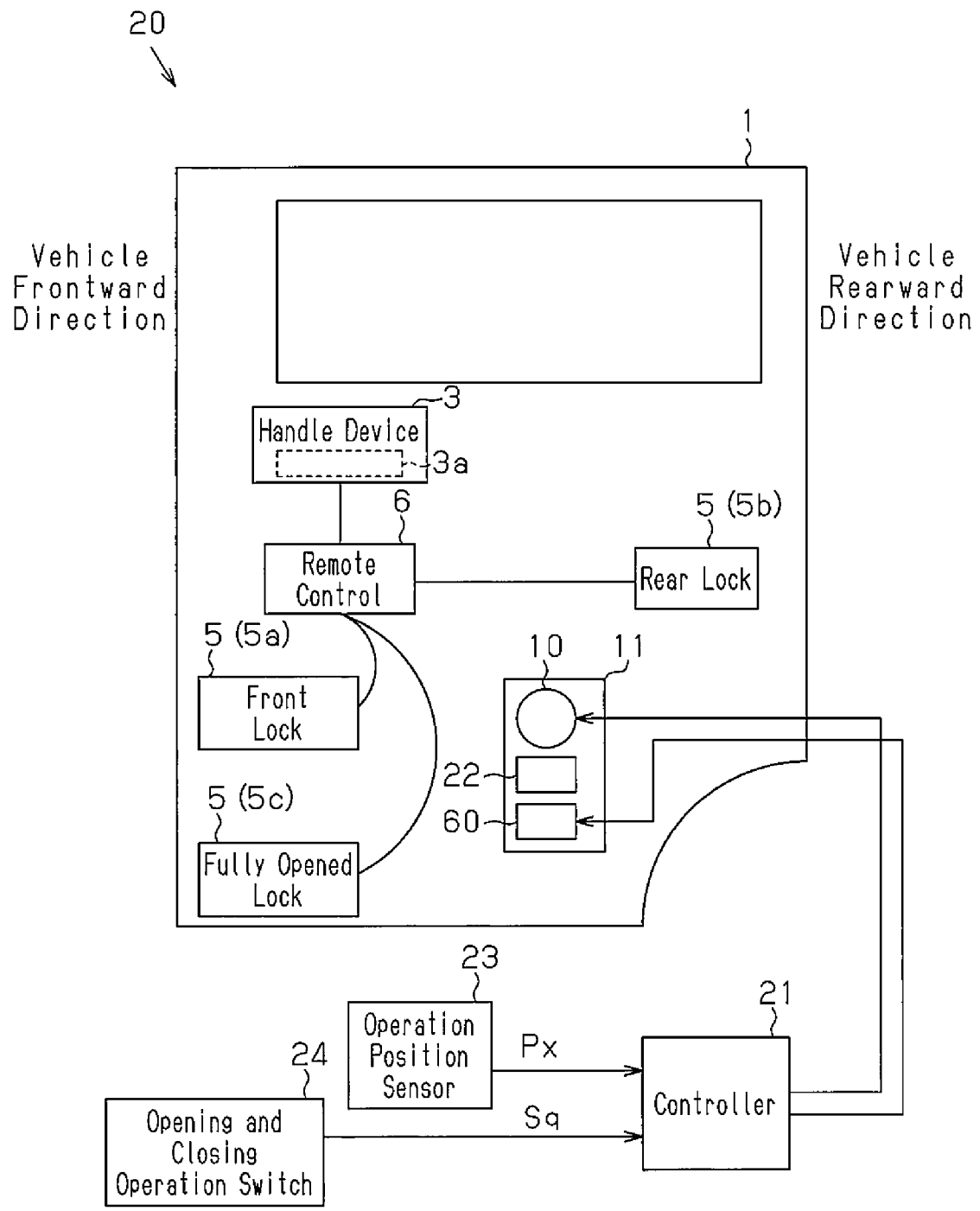
FIG. 1 is a block diagram illustrating a schematic configuration of a power slide door device.

As shown in FIG. 1, a slide door 1, which serves as an opening and closing body provided in a vehicle, is configured to move in the vehicle front back direction to open and close an opening (not shown) formed in the side of the vehicle body. Specifically, the slide door 1 moves in the vehicle frontward direction (left in FIG. 1) to close the opening in the body to be in the closed state. Further, the slide door 1 moves in the vehicle rearward direction (right in FIG. 1) to be in the open state where the occupants may exit or enter the vehicle through the opening. The slide door 1 includes a handle device 3, which is operated to open and close the slide door 1.

In details, the slide door 1 includes three locking mechanisms (latch mechanisms) 5, which are a front lock 5a, a rear lock 5b (fully closed locks) for restraining the slide door 1 at a fully closed position, and a fully opened lock 5c for restraining the slide door 1 at a fully opened position. Each locking mechanism (latch mechanism) 5 is mechanically connected to the handle device 3 through a transmitting member such as a wire, which extends from a remote control 6.

That is, the operation input to the handle device 3 is transmitted to each locking mechanism 5 based on the operation of operation portions (an outer handle and an inner handle) 3a provided on the exterior surface and the interior surface of the slide door 1. The restraint of the slide door 1 is cancelled based on the operation force. This permits the movement of the slide door 1 at the fully closed position in the opening direction, or the movement of the slide door 1 at the fully opened position in the closing direction.

Further, the vehicle includes a power slide door device 20, which includes an actuator device 11 with a motor 10 as a driving source and performs an opening and closing operation on the slide door 1.

In details, in the present embodiment, the motor 10 of the actuator device 11 is rotated based on the driving power supplied by a controller 21. That is, the operation of the actuator device 11 is controlled through the supply of the driving power, which the controller 21 performs. Further, the actuator device 11 includes a speed reduction mechanism 22, which reduces the rotation speed of the motor 10 and supplies outputs of the motor 10. In the power slide door device 20 according to the present embodiment, the rotation of the motor 10, in which the rotation speed is reduced by the speed reduction mechanism 22, is transmitted to the driving portion (not shown) of the slide door 1 to perform the opening and closing operation of the slide door 1.

In more detail, in the present embodiment, the controller 21 is connected to an operation position sensor 23, which detects the operation position (opened or closed position) Px of the slide door 1. Further, the above handle device 3, a portable device (remote control key), or an opening and closing operation switch 24 provided in the passenger compartment are operated so that operation request signals Sq, which request the opening and closing operation of the slide door 1 by driving the motor, are supplied to the controller 21. The controller 21 is configured to control the operation of the actuator device 11 to perform the opening and closing operation on the slide door 1 or stop the slide door 1 based on the input of the operation request signals Sq and the operation position Px of the slide door 1.

Electromagnetic Clutch Device

Next, the configuration of the electromagnetic clutch device provided in the actuator device will be described.

Figure 2:
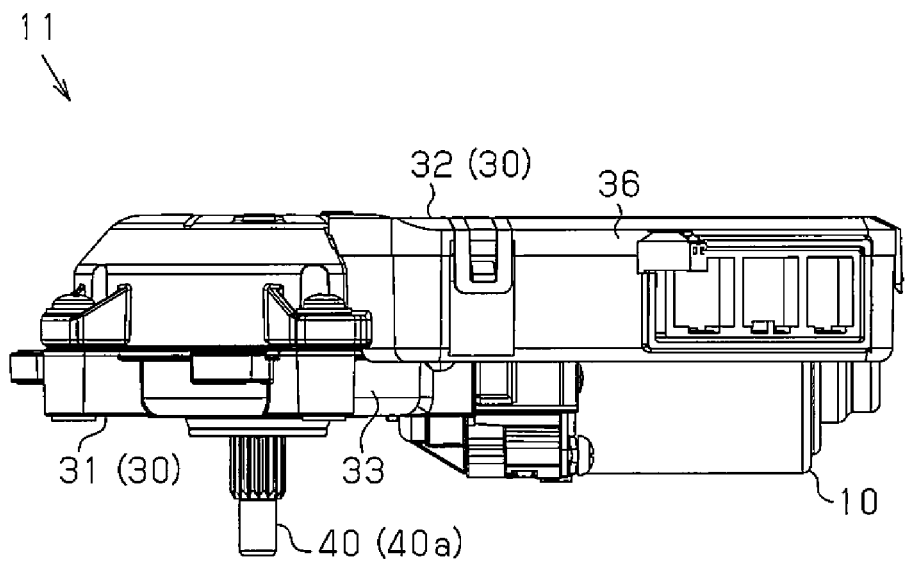
FIG. 2 is a plan view illustrating an actuator device.
Figure 3:
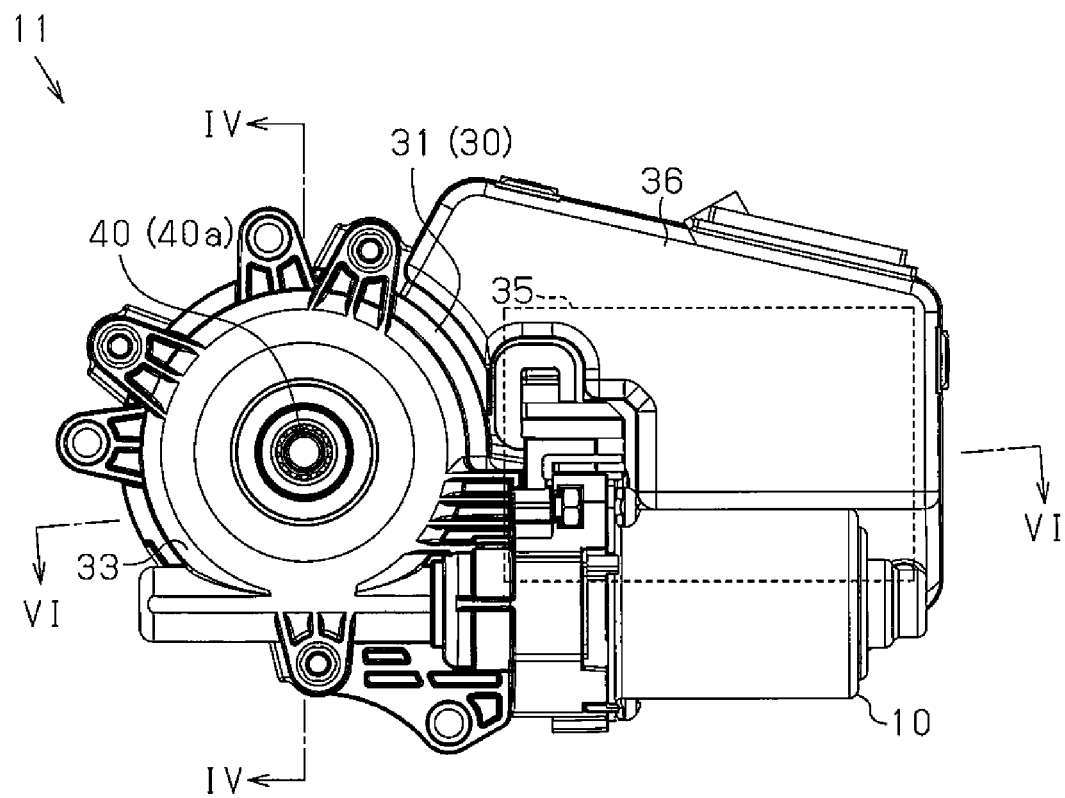
FIG. 3 is a side view illustrating the actuator device.
Figure 4:
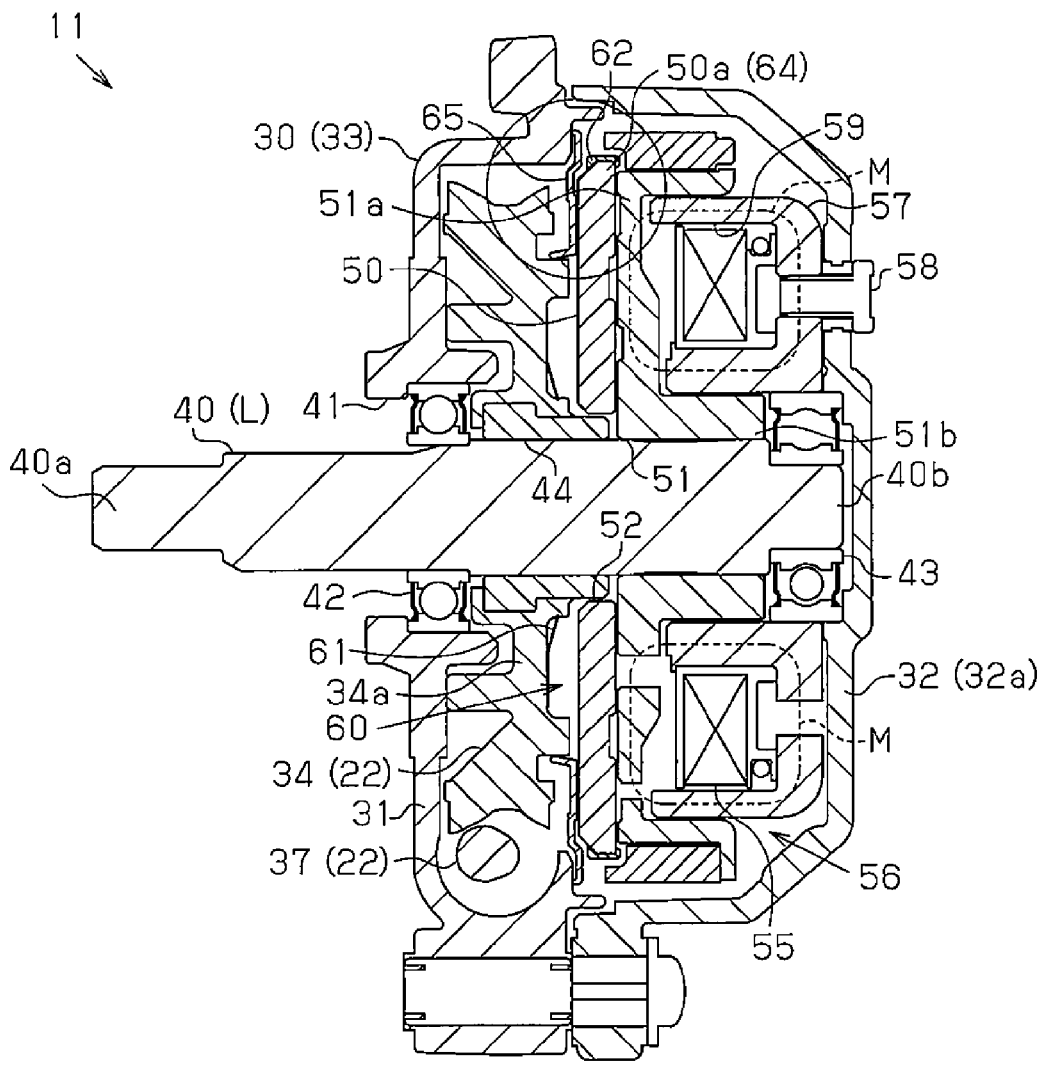
FIG. 4 is a cross-sectional view illustrating the actuator device (taken along line IV-IV in FIG. 3)

As shown in FIGS. 2 to 4, the actuator device 11 according to the present embodiment includes a housing 30, which accommodates the above speed reduction mechanism 22. According to the present embodiment, the housing 30 is formed by attaching a first housing member 31 and a second housing member 32 to each other. The housing 30 includes a gear accommodation portion 33, which accommodates the speed reduction mechanism 22.

In details, in the housing 30 according to the present embodiment, the gear accommodation portion 33 has a flat, substantially cylindrical profile. In the present embodiment, a well-known worm drive is employed for the speed reduction mechanism 22. The gear accommodation portion 33 accommodates its wheel gear 34 in a rotational manner.

That is, as shown in FIGS. 2 and 3, the motor 10 according to the present embodiment is fixed to the housing 30 by inserting the motor shaft, which is not illustrated, into the gear accommodation portion 33. Specifically, the housing 30 according to the present embodiment includes a board accommodation portion 36. The board accommodation portion 36 includes a flat, substantially rectangular box-like profile, which extends in the lateral direction (right in each of FIGS. 2 and 3) of the gear accommodation portion 33, and accommodates a control board 35. The motor 10 is fixed to the first housing member 31 in substantially parallel with the board accommodation portion 36. As shown in FIG. 4, a wheel gear 34 is arranged in the first housing member 31 (left in FIG. 4) in the gear accommodation portion 33 in the state where the wheel gear 34 engages with a worm gear 37, which rotates integrally with the motor shaft.

In more detail, as shown in FIG. 4, an output shaft 40 is rotationally supported by the gear accommodation portion 33 such that the output shaft 40 passes through the first housing member 31 in the thickness direction (lateral direction in FIG. 4). The output shaft 40 has a tip end 40a. Specifically, the first housing member 31 has an opening 41, through which the output shaft 40 is inserted, at a position as a central portion of the gear accommodation portion 33, which forms a substantially cylindrical shape. Each of ball bearings 42 and 43, which rotationally support the output shaft 40, is located in the corresponding one of the opening 41 and the bottom wall 32a of the second housing member 32, which faces the opening 41.

The wheel gear 34 includes an annular slide bearing 44 in the central portion of the wheel gear 34, which serves as a rotation center. The above output shaft 40 is inserted through the slide bearing 44 so that the wheel gear 34 is rotationally supported about the output shaft 40 as a rotation axis L.

In the present embodiment, the gear accommodation portion 33 accommodates an armature 50 and a rotor 51. The armature 50 is supported by the above wheel gear 34 so that the armature 50 is movable in the axial direction and rotates integrally with the wheel gear 34. The rotor 51 is adapted to be arranged coaxially with the armature 50. The rotor 51 rotates with respect to the armature 50, and rotates integrally with the above output shaft 40.

Figure 5:
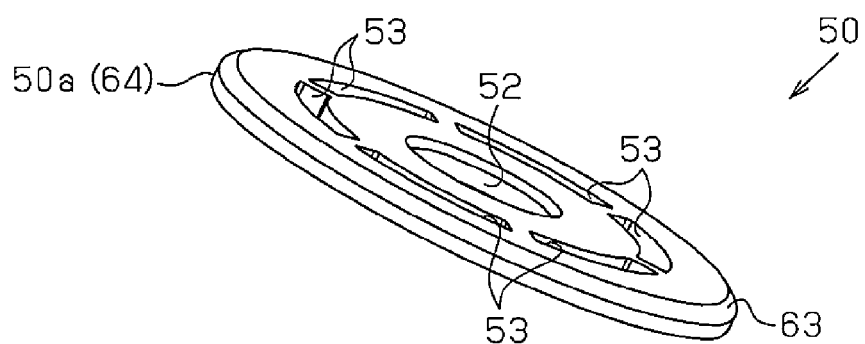
FIG. 5 is a perspective view illustrating an armature.

As shown in FIGS. 4 and 5, the armature 50 according to the present embodiment includes a substantially disk-shaped profile with a circular hole 52 in the central portion. The armature 50 is formed of a ferrous magnetic material. The above output shaft 40 is inserted through the circular hole 52 so that the armature 50 is arranged coaxially with the wheel gear 34.

Figure 6:
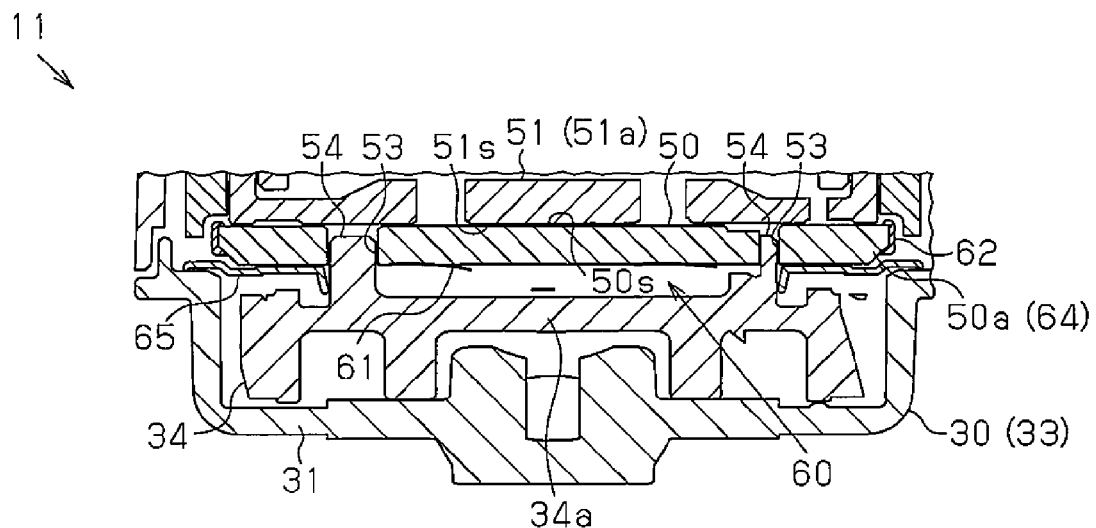
FIG. 6 is a cross-sectional view illustrating the actuator device (taken along line VI-VI in FIG. 3)

As shown in FIGS. 5 and 6, the armature 50 includes a plurality of through-holes 53 circumferentially arranged about the circular hole 52. Further, the wheel gear 34 includes a plurality of supporting protrusions 54, which extend in the axial direction of the output shaft 40 as a rotation axis L. Each protrusion 54 is inserted into the corresponding through-hole 53 of the armature 50. The armature 50 is supported by the supporting protrusions 54 to rotate integrally with the wheel gear 34, which serves as a driving member, and move in the axial direction.

As shown in FIG. 4, the rotor 51 is arranged in the second housing member 32 (right in FIG. 4) in the gear accommodation portion 33 in the state where the rotor 51 is fixed coaxially with the above output shaft 40 to rotate integrally with the output shaft 40.

Further, the rotor 51 according to the present embodiment is formed of a ferrous magnetic material, like the above armature 50. Moreover, the gear accommodation portion 33 includes an electromagnetic coil 55. The electromagnetic coil generates magnetomotive force when a current is supplied through the electromagnetic coil 55. In the present embodiment, an electromagnet 56, which presses the armature 50 and the rotor 51 against each other based on the electromagnetic attraction force generated when current is supplied through the electromagnetic coil 55, is provided.

Specifically, the gear accommodation portion 33 includes a yoke 57 with a substantially annular profile, which surrounds a basal portion 40b of the output shaft 40 and a fixed portion 51b of the rotor 51. In the present embodiment, the yoke 57 is fixed to the bottom wall 32a of the second housing member 32 using a bolt 58. Further, the yoke 57 is formed of a ferrous magnetic material, like the above armature 50 and the rotor 51. Moreover, the yoke 57 includes an annular groove 59, which faces a disk-shaped rotor body 51a and opens in the axial direction (in the direction facing the first housing member 31, namely, left in FIG. 4). The electromagnetic coil 55 is held in the state where the electromagnetic coil 55 is wound in the circumferential direction in the annular groove 59 with a substantially U-shaped cross section.

That is, the electromagnetic coil 55 according to the present embodiment forms a magnetic circuit M in the yoke 57 and the rotor 51, which are arranged at positions to surround the electromagnetic coil 55, when the current is supplied through the electromagnetic coil 55. In the present embodiment, the electromagnet 56 formed including the rotor 51 attracts the armature 50, which is provided to be movable in the axial direction, so that the armature 50 and the rotor 51 are pressed against each other.

In the actuator device 11 according to the present embodiment, the armature 50 is adapted to rotate integrally with the wheel gear 34 (driving member), and the rotor 51 is adapted to rotate integrally with the output shaft 40 (output member). The armature 50 and the rotor 51 are configured to be coupled with each other such that the torque of the motor 10 is transmitted by pressing the facing surfaces 50s and 51s of the armature 50 and the rotor 51 against each other. Accordingly, in the present embodiment, an electromagnetic clutch device 60, which switches the above armature 50 and the rotor 51 between the open state and the coupled state based on the control of the supply of the current to the electromagnetic coil 55, is provided. In the open state, the armature 50 and the rotor 51 are allowed to rotate relative to each other. In the coupled state, the armature 50 and the rotor 51 are coupled with each other in the torque transmittable manner.

That is, the magnetic attraction force of the electromagnet 56 is lost by stopping the supply of the current to the electromagnetic coil 55. This brings the armature 50 and the rotor 51 into the open state, in which the armature 50 and the rotor 51 are allowed to rotate relative to each other, which interrupts the torque transmission path between the motor 10, which serves as a driving source, and the output shaft 40, which serves as an output member.

Silencing Structure

Next, a silencing structure in the electromagnetic clutch device according to the present embodiment will be described.

Figure 7:
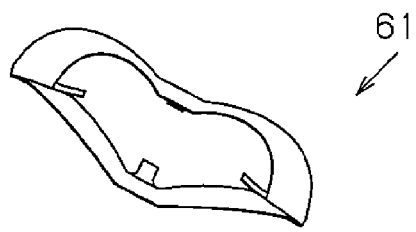
FIG. 7 is a perspective view illustrating a wave washer.

As shown in FIGS. 4, 6, and 7, in the present embodiment, a wave washer 61, which serves as an urging member, is located between the armature 50 and the wheel gear 34, which supports the armature 50, more specifically, between the armature 50 and a disk-shaped wheel gear body 34a. Specifically, the wave washer 61 includes a well-known structure with protrusions and recesses alternately arranged in the circumferential direction. The wave washer 61 is located between the armature 50 and the wheel gear 34 in the state where the above output shaft 40 is inserted through inside of the annular shape of the wave washer 61. The armature 50 is urged in the axial direction based on the elastic force of the wave washer 61 so that the armature 50 is held in the state where the facing surface 50s, which faces the rotor 51, is brought into contact with the facing surface 51s of the rotor 51.

That is, the electromagnetic clutch device 60 according to the present embodiment is configured such that, in a decoupled state, in which the supply of the current to the above electromagnetic coil 55 is not performed, the armature 50 and the rotor 51 rotate relative to each other while slidably contacting each other. Accordingly, in the present embodiment, the contact sound between the armature 50 and the rotor 51 is limited by reducing the gap (clearance) between the armature 50 and the rotor 51.

Figure 8:
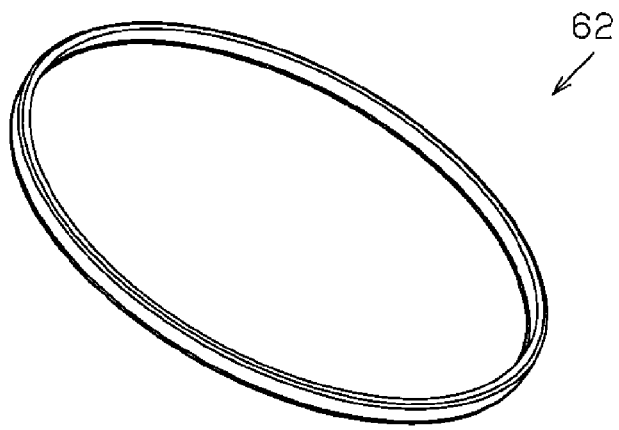
FIG. 8 is a perspective view illustrating a silencing member.
Figure 9:
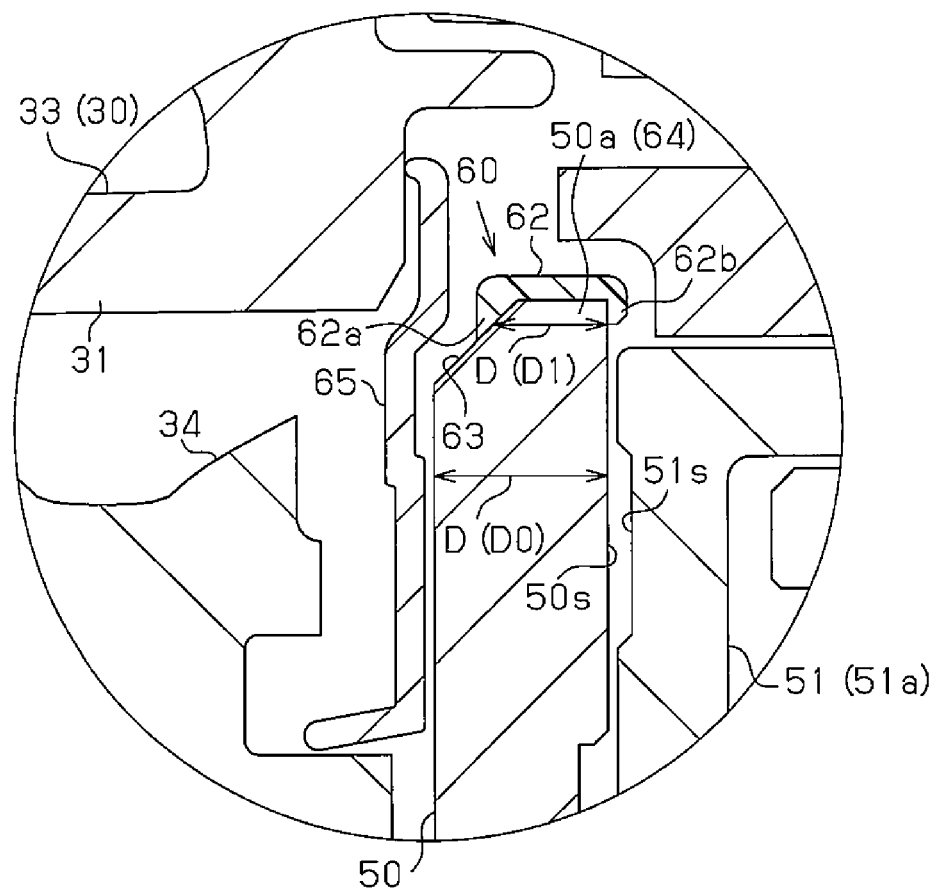
FIG. 9 is an expanded cross-sectional view illustrating the vicinity of the silencing member (enclosed portion in FIG. 3)

As shown in FIGS. 8 and 9, the electromagnetic clutch device 60 according to the present embodiment includes a silencing member 62, which is provided on an outer circumferential portion 50a of the armature 50 and is formed of a soft material that attenuates noise generated by the vibration of the armature 50 in the state where the silencing member 62 is out of contact with any member other than the armature 50.

In details, in the present embodiment, the silencing member 62 is formed of a material softer than the material of the armature 50. Specifically, the silencing member 62 is formed of materials such as an elastically deformable rubber and a soft plastic. The silencing member 62 includes an annular profile, which fits the outer circumferential portion 50a of the armature 50.

Figure 10:
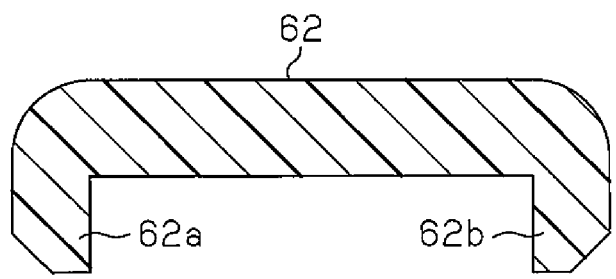
FIG. 10 is a cross-sectional view illustrating the silencing member.

In more details, as shown in FIG. 10, the silencing member 62 according to the present embodiment includes flanges 62a and 62b, which sandwich the outer circumferential portion 50a of the armature 50 in the axial direction (in the lateral direction in FIG. 10). As shown in FIG. 9, a tapered surface 63 is formed on the outer circumferential portion 50a of the armature 50 opposite to the above facing surface 50s. Accordingly, in the present embodiment, the outer circumferential portion 50a of the armature 50 forms a thin portion 64 with a small thickness D in the axial direction (D0>D1 in FIG. 9). That is, the thin portion 64 includes the tapered surface 63 on the surface opposite to the facing surface of the armature 50, which faces the rotor 51 in the axial direction.

That is, the silencing member 62 fits on the thin portion 64 formed on the outer circumferential portion 50a of the armature 50 in the state where one of the flanges, i.e., the flange 62a is elastically deformed. Further, a substantially annular sealing member 65, which extends along the inner circumference of the substantially cylindrical gear accommodation portion 33, is located in an interface between the first housing member 31 and the second housing member 32. Specifically, the sealing member 65 serves as a grease sealing plate, which prevents, between the substantially disk-shaped armature 50 and the wheel gear body 34a, the leakage of the lubricant (e.g., grease) applied to the speed reduction mechanism 22 into the second housing member 32, which accommodates the electromagnetic coil 55. In the present embodiment, the thin portion 64 is formed on the outer circumferential portion 50a of the armature 50 as descried above so that the silencing member 62 and the sealing member 65 are configured to avoid interference between the silencing member 62 and the sealing member 65.

Next, the operation of the electromagnetic clutch device 60 as above configured will be described.

In the present embodiment, the operation of the above electromagnetic clutch device 60 is also controlled by the controller 21. For example, when the slide door 1 is manually opened and closed, the supply of the current to the electromagnetic coil 55 is stopped. This brings the electromagnetic clutch device 60 into the open state, in which the torque transmission path of the actuator device 11 is interrupted. Accordingly, the smooth operation of the slide door 1 is reliably achieved even when the slide door 1 is manually operated.

As mentioned above, the present embodiment has the following advantages.

(1) For example, the sound emitted from the armature 50, such as an abnormal noise generated according to the stick-slip phenomenon between the armature 50 and the rotor 51, is caused by the vibration of the armature 50. Accordingly, the silencing member 62 formed of a soft material is provided on the armature 50 as described above. This attenuates the sound generated by the vibration of the armature 50. In particular, the outer circumferential portion 50a of the armature 50 most greatly vibrates. Therefore, a more prominent advantage is obtained by providing the silencing member 62 on the outer circumferential portion 50a. As a result, a more effective silencing performance is achieved.

(2) The annular silencing member 62 fits the outer circumferential portion 50a. This advantageously attenuates the sound generated by the vibration of the armature 50 over the whole circumference of the armature 50.

(3) In particular, the armature 50 is formed of an elastically deformable soft material to achieve very effective noise reduction. In addition, this facilitates the attachment to the outer circumferential portion 50a of the armature 50.

(4) The flanges 62a and 62b, which sandwich the outer circumferential portion 50a of the armature 50 in the axial direction, are provided. This reliably fixes the silencing member 62 to the outer circumferential portion 50a of the armature 50.

(5) The thin portion 64 with a small thickness D in the axial direction is formed on the outer circumferential portion 50a of the armature 50. This avoids the interference of the silencing member 62 provided on the outer circumferential portion 50a, which greatly vibrates, with the members other than the armature 50, such as the sealing member 65.

(6) The silencing member 62 is provided on the outer circumferential portion 50a of the armature 50 so that the wave washer 61, which serves as an urging member, is located at a radially inner position between the armature 50 and the wheel gear 34. The armature 50 is urged in the axial direction based on the elastic force of the wave washer 61 to be brought into contact with the rotor 51 in advance. This limits the contact sound between the armature 50 and the rotor 51.

(7) The tapered surface 63 is formed on one of the surfaces of the outer circumferential portion 50a of the armature 50 in the axial direction (surface opposite to the facing surface 50s). This facilitates the manufacture of the thin portion using press working.

The above described embodiment may be modified as follows.

In the above embodiment, the soft material, which configures the silencing member 62, is softer than the material of the armature 50 and elastically deformable. The rubber and the soft plastic are illustrated as examples corresponding to the soft material. However, the soft material is not limited to these. For example, a sponge may be used as the soft material, which configures the silencing member 62, as long as the silencing member 62 attenuates the sound generated by the vibration of the armature 50 in a state where the silencing member 62 is out of contact with any members other than the armature 50.

In the above embodiment, the wave washer 61 is used as an urging member to bring the armature 50 into contact with the rotor 51. The urging member may be appropriately changed. The urging member may be omitted.

In the above embodiment, the silencing member 62 includes an annular profile, which fits the outer circumferential portion 50a of the armature 50. However, the shape of the silencing member 62 is not limited to this. The shape of the silencing member 62 may be appropriately changed. For example, the shape of the silencing member 62 may be C-shaped formed by removing a portion in the circumferential direction. A plurality of silencing members 62 may be provided at positions of the armature 50 in the circumferential direction. The flanges 62a and 62b, which sandwich the outer circumferential portion 50a of the armature 50 in the axial direction, may be omitted.

In the above embodiment, the magnetic circuit M is formed in the rotor 51 so that the electromagnet 56 including the rotor 51 is formed. However, the form of the electromagnet 56 is not limited to this. The form of the electromagnet 56 may be appropriately changed as long as the armature 50 and the rotor 51 are pressed against each other based on the electromagnetic attraction force so that the armature 50 and rotor 51 are coupled with each other in the torque transmittable manner.

In the above embodiment, the tapered surface 63 is formed on the surface opposite to the facing surface 50s so that the thin portion 64 with a small thickness D in the axial direction is formed on the outer circumferential portion 50a of the armature 50. However, the shape of the thin portion 64 is not limited to this. The shape of the thin portion 64 may be appropriately changed. For example, the outer circumferential portion 50a may include a step. The thickness of the surface facing the facing surface 50s or the thicknesses of both surfaces of the outer circumferential portion 50a may be reduced. Also, such a thin portion 64 may be omitted.

In the above embodiment, the wheel gear 34, which configures the speed reduction mechanism 22, serves as a driving member. The driving member may be appropriately changed.

In the above embodiment, the present invention is embodied in the electromagnetic clutch device 60 provided in the actuator device 11. The present invention may be applied to electromagnetic clutch devices used for uses other than this.

The actuator device 11 is used for the power slide door device 20. The present invention may be applied to actuator devices used for purposes other than this. For example, the present invention may be applied to other opening and closing body driving controllers for a vehicle for performing opening and closing operations on opening and closing bodies other than the slide door 1, such as a rear door, a trunk door, or a trunk lid provided in the rear portion of the vehicle.

Therefore, the present examples and embodiments are to be considered as illustrative and not restrictive and the invention is not to be limited to the details given herein, but may be modified within the scope and equivalence of the appended claims.

The invention claimed is:

1. An electromagnetic clutch device comprising:
   an armature adapted to be supported by a driving member so that the armature is movable in an axial direction and rotates integrally with the driving member;
   a rotor adapted to be arranged coaxially with the armature, wherein the rotor rotates with respect to the armature and rotates integrally with an output member;
   an electromagnet, which presses the armature and the rotor against each other based on an electromagnetic attraction force generated when current is supplied through the electromagnet, thereby coupling the armature and the rotor to each other in a torque transmittable manner; and
   a silencing member provided on an outer circumferential portion of the armature, wherein the silencing member is formed to attenuate noise generated by vibration of the armature in a state where the silencing member is out of contact with any member other than the armature, the silencing member including flanges that sandwich the armature in the axial direction.

2. The electromagnetic clutch device according to claim 1, wherein the silencing member is annular and fits the outer circumferential portion of the armature.

3. An electromagnetic clutch device comprising:
   an armature adapted to be supported by a driving member so that the armature is movable in an axial direction and rotates integrally with the driving member;
   a rotor adapted to be arranged coaxially with the armature, wherein the rotor rotates with respect to the armature and rotates integrally with an output member;
   an electromagnet, which presses the armature and the rotor against each other based on an electromagnetic attraction force generated when current is supplied through the electromagnet, thereby coupling the armature and the rotor to each other in a torque transmittable manner;
   a silencing member provided on an outer circumferential portion of the armature, wherein the silencing member is formed to attenuate noise generated by vibration of the armature in a state where the silencing member is out of contact with any member other than the armature; and
   an urging member located between the driving member and the armature, wherein the urging member urges the armature in the axial direction at a radially inner position with respect to the silencing member to bring the armature into contact with the rotor.

4. An actuator device comprising the electromagnetic clutch device according to claim 1.

5. An opening and closing body controller for a vehicle comprising the actuator device according to claim 4.

* * * * *